(12) United States Patent
Dalton et al.

(10) Patent No.: US 7,879,207 B2
(45) Date of Patent: Feb. 1, 2011

(54) ELECTROCHEMICAL CELL WITH DYNAMIC ENDPLATE

(75) Inventors: Luke Thomas Dalton, Portland, CT (US); Benjamin Michael Piecuch, Meriden, CT (US); Gregory A. Hanlon, Windsor, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 1148 days.

(21) Appl. No.: 11/548,415

(22) Filed: Oct. 11, 2006

(65) Prior Publication Data

US 2008/0090140 A1    Apr. 17, 2008

(51) Int. Cl.
*C25B 9/00* (2006.01)
(52) U.S. Cl. ...................... 204/253; 204/257
(58) Field of Classification Search ............... None
See application file for complete search history.

(56) References Cited

U.S. PATENT DOCUMENTS

| | | | |
|---|---|---|---|
| 4,714,662 A | 12/1987 | Bennett | |
| 5,789,091 A * | 8/1998 | Wozniczka et al. | 429/12 |
| 5,837,110 A | 11/1998 | Dean | |
| 5,968,325 A * | 10/1999 | Oloman et al. | 204/230.5 |
| 6,428,921 B1 * | 8/2002 | Grot | 429/37 |
| 6,576,362 B2 * | 6/2003 | Hanlon | 429/34 |
| 7,048,839 B2 | 5/2006 | Harada | |

FOREIGN PATENT DOCUMENTS

EP     0936689 B1     4/2004

* cited by examiner

*Primary Examiner*—Harry D Wilkins, III
(74) *Attorney, Agent, or Firm*—Cantor Colburn LLP

(57) ABSTRACT

An electrochemical cell stack and method are provided with use the generated hydrogen gas to pressurize a chamber. The electrochemical cell stack includes a plurality of cells mounted between a first static endplate and a dynamic endplate. A pressure chamber is formed between a second static endplate and the dynamic endplate. The chamber acts upon a dynamic endplate to increase the loading on a plurality of cells as the generated gas pressure increases.

16 Claims, 5 Drawing Sheets

ELECTROCHEMICAL CELL WITH DYNAMIC ENDPLATE

STATEMENT REGARDING FEDERALLY FUNDED PROGRAMS

This invention was made with Government support under contract NAS3-03027 awarded by the National Aeronautics and Space Administration. The United States Government has certain rights in this invention.

FIELD OF INVENTION

The present disclosure relates to electrochemical cells, and in particular to features of proton exchange membrane electrochemical cell systems.

BACKGROUND

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exit cell 100, while protons 106 and water 110 migrate across a proton exchange membrane 118 to cathode 114 where hydrogen gas 112 is formed.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen gas is introduced to the hydrogen electrode (the anode in fuel cells), while oxygen, or an oxygen-containing gas such as air, is introduced to the oxygen electrode (the cathode in fuel cells). Water can also be introduced with the feed gas. The hydrogen gas for fuel cell operation can originate from a pure hydrogen source, hydrocarbon, methanol, or any other hydrogen source that supplies hydrogen at a purity suitable for fuel cell operation (i.e., a purity that does not poison the catalyst or interfere with cell operation). Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells can be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include one or more individual cells arranged in a stack, with the working fluids directed through the cells via input and output conduits formed within the stack structure. The cells within the stack are sequentially arranged, each including a cathode, a proton exchange membrane, and an anode (hereinafter "membrane electrode assembly", or "MEA"). Each cell typically further comprises a first flow field in fluid communication with the cathode and a second flow field in fluid communication with the anode. The MEA may be supported on either or both sides by screen packs or bipolar plates disposed within the flow fields, and which may be configured to facilitate membrane hydration and/or fluid movement to and from the MEA.

In order to maintain intimate contact between cell components under a variety of operational conditions and over long time periods, uniform compression is applied to the cell components. Thus, while existing compression in current electrochemical cells are suitable for their intended purposes, there still remains a need for improvements, particularly regarding devices and methods for providing uniform compression to the electrochemical cells generating hydrogen at high pressures.

SUMMARY

An electrochemical cell stack is provided that includes a plurality of cells each of having a membrane and a first and second electrode. A first static endplate is coupled to the plurality of cells and a second static endplate is mounted in a fixed relationship to the first static endplate. The second static endplate is arranged opposite said first static endplate. A dynamic endplate is mounted between the second static endplate and the plurality of cells, and a pressure chamber formed between the static endplate and the dynamic endplate. The pressure chamber is arranged to be fluidly coupled to the plurality of cells.

An electrochemical cell stack is also provided having a plurality of coaxially arranged cells. Each of the plurality of cells has an anode electrode and a cathode electrode with a membrane disposed there between. The plurality of cells further includes a first flow field in fluid communication with the anode electrode and a second flow field in fluid communication with the cathode electrode. A first static endplate is arranged in contact with one end of the plurality of cells. A dynamic endplate having an upper surface and a lower surface is arranged opposite the first static endplate with the lower surface being in contact with the plurality of cells. A second static endplate is coupled to the first static endplate, and a pressure chamber is arranged between the second static endplate and the dynamic endplate.

A method of operating an electrochemical cell stack is provided comprising the steps of preloading a plurality of cells between a dynamic endplate and a first static endplate. Generating hydrogen gas with the plurality of cells and increasing the pressure in a chamber with the generated hydrogen gas. The pressure in the chamber is applied to the dynamic endplate. Finally, the loading on the plurality of cells is increased by increasing the gas pressure in the chamber.

The above-described drawbacks and disadvantages are alleviated by utilization of the generated hydrogen gas pressure to increase compression on the electrochemical cell stack.

DESCRIPTION OF DRAWINGS

Referring now to the drawings, which are meant to be exemplary and not limiting, and wherein like elements are numbered alike in the several Figures.

DETAILED DESCRIPTION

Disclosed herein are methods and apparatus for providing uniform compression to cell components of electrochemical cells under a variety of operational conditions and over long time periods.

Although the disclosure below is described in relation to a proton exchange membrane electrochemical cell employing hydrogen, oxygen, and water, various reactants may also be used, including, but not limited to, hydrogen bromine, oxygen, air, chlorine, and iodine. Upon the application of different reactants and/or different electrolytes, the flows and reactions are understood to change accordingly, as is commonly understood in relation to that particular type of electrochemical cell.

Figure 1:
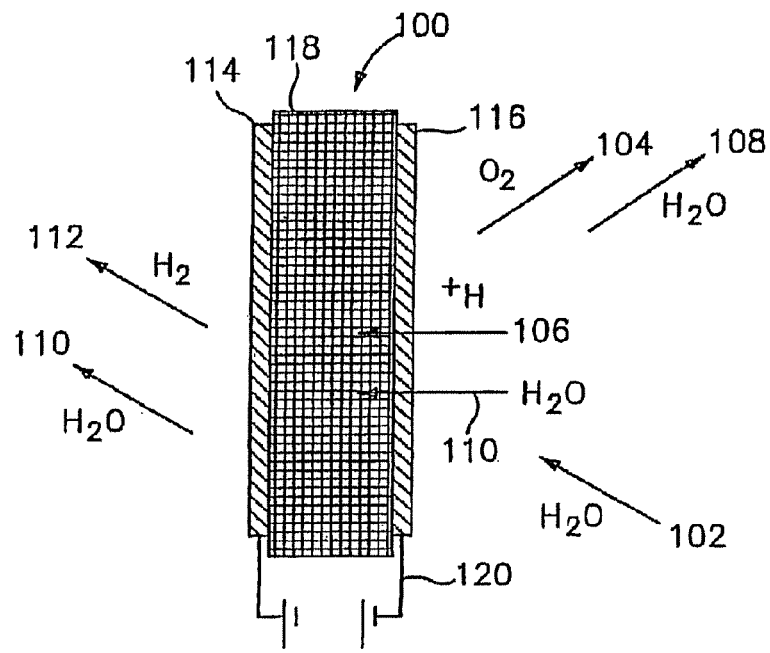
FIG. 1 is a schematic diagram of a partial prior art electrochemical cell showing an electrochemical reaction.
Figure 2:
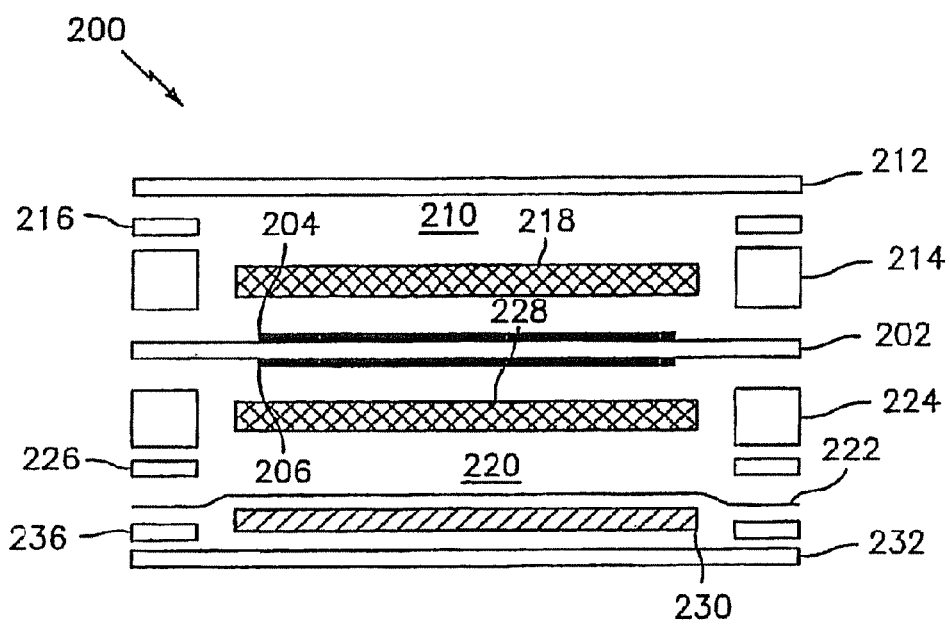
FIG. 2 is an expanded schematic diagram of a prior art electrochemical cell.

Referring to FIG. 2, one exemplary embodiment of an electrochemical cell 200 suitable for operation as an anode feed electrolysis cell, cathode feed electrolysis cell, fuel cell, or regenerative fuel cell is schematically shown. Thus, while the discussion below is directed to an anode feed electrolysis cell, it should be understood that cathode feed electrolysis cells, fuel cells, and regenerative fuel cells are also within the scope of the present invention. Cell 200 is typically one of a plurality of cells employed in a cell stack as part of an electrochemical cell system. When cell 200 is used as an electrolysis cell, power inputs are generally between about 1.48 volts and about 3.0 volts, with current densities between about 50 A/ft$^2$ (amperes per square foot) and about 4,000 A/ft$^2$. When used as a fuel cells power outputs range between about 0.4 volts and about 1 volt, and between about 0.1 A/ft$^2$ and about 10,000 A/ft$^2$. The number of cells within the stack, and the dimensions of the individual cells is scalable to the cell power output and/or gas output requirements.

Cell 200 includes a membrane 202 having a first electrode (e.g., an anode) 204 and a second electrode (e.g., a cathode) 206 disposed on opposite sides thereof. Flow fields 210, 220, which are in fluid communication with electrodes 204 and 206, respectively, are defined generally by the regions proximate to, and bounded on at least one side by, each electrode 204 and 206 respectively. A flow field member 228, for example a screen pack or bipolar plate, is optionally disposed within flow field 220 between electrode 206 and, optionally, a pressure pad separator plate 222. A pressure pad 230 is typically disposed between pressure pad separator plate 222 and a cell separator plate 232. Cell separator plate 232 is disposed adjacent to pressure pad 230. A frame 224, generally surrounding flow field 220 and an optional gasket 226, is disposed between frame 224 and pressure pad separator plate 222 generally for enhancing the seal within the reaction chamber defined on one side of cell 200 by frame 224, pressure pad separator plate 222 and electrode 206. Gasket 236 is optionally disposed between pressure pad separator plate 222 and cell separator pad 232 enclosing pressure pad 230.

Another flow field member 218 is optionally disposed in flow field 210. A frame 214 generally surrounds flow field member 218, a cell separator plate 212 is disposed adjacent flow field member 218 opposite oxygen electrode 204, and a gasket 216 is disposed between frame 214 and cell separator plate 212, generally for enhancing the seal within the reaction chamber defined by frame 214, cell separator plate 212 and the oxygen side of membrane 202. The cell components, particularly cell separator plates 212, 232, frames 214, 224, and gaskets 216, 226, and 236 are formed with the suitable manifolds or other conduits as is conventional.

Membrane 202 comprises electrolytes that are preferably solids or gels under the operating conditions of the electrochemical cell. Useful materials include proton conducting ionomers and ion exchange resins. Useful proton conducting ionomers include complexes comprising an alkali metal salt, alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION™ resins (commercially available from E. I. du Pont de Nemours and Company, Wilmington, Del.).

Electrodes 204 and 206 comprise catalyst suitable for performing the needed electrochemical reaction (i.e., electrolyzing water to produce hydrogen and oxygen). Suitable metals from which electrodes can be fabricated include, but are not limited to, platinum, palladium, rhodium, carbon, gold, tantalum, tungsten, ruthenium, iridium, osmium, alloys of at least one of the foregoing catalysts, and the like. However, while certain catalysts are specifically listed, it is contemplated that other catalysts capable of electrolyzing water and producing hydrogen (in the case of electrolysis cell operation) and/or capable of breaking down hydrogen into ions (in the case of fuel cell operation) are suitable with the electrode structure generally described. A preferred catalyst is platinum or palladium. Electrodes 204 and 206 may be fabricated by layering or pressing electrode catalyst provided in a planar form on membrane 202. Both techniques are known in the art.

Flow field members 218, 228 support membrane 202, allow the passage system fluids to promote hydration of cell components, and preferably are electrically conductive, and may be, for example, screen packs or bipolar plates. The screen packs include one or more layers of perforated sheets or a woven mesh formed from metal or strands. These screens are typically fabricated of metals that include, for example, niobium, zirconium, tantalum, titanium, carbon steel, stainless steel, nickel, cobalt, and alloys thereof. Bipolar plates are commonly perforated structures through which fluid communication can be maintained. Materials from which the bipolar plates can be fabricated include, but are not limited to, fibrous carbon or fibrous carbon impregnated with polytetrafluoroethylene or PTFE (commercially available under the trade name TEFLON® from E. I. du Pont de Nemours and Company).

Pressure pad 230 provides even compression between cell components, is electrically conductive, and therefore generally comprises a resilient member, preferably an elastomeric material, together with a conductive material. Suitable elastomeric materials include, but are not limited to silicones, such as, for example, fluorosilicones; fluoroelastomers, such as KALREZ® (commercially available from E. I. du Pont de Nemours and Company), VITON® (commercially available from E. I. du Pont de Nemours and Company), and FLUOREL® (commercially available from Minnesota Mining and Manufacturing Company, St. Paul, Minn.); and combinations thereof. The electrically conductive material is preferably compatible with the system fluids and membrane 202. Suitable electrically conductive materials include, but are not limited to, conductive metals and alloys and superalloys thereof, for example niobium; zirconium; tantalum; titanium; niobium; iron and iron alloys, for examples steels such as stainless steel; nickel and nickel alloys such as HASTELOY7 (commercially available from Haynes International, Kokomo, Ind.); cobalt and cobalt superalloys such as ELGILOY7 (commercially available from Elgiloy® Limited Partnership, Elgin, Ill.) and MP35N7 (commercially available from Maryland Specialty Wire, Inc., Rye, N.Y.); hafnium, and tungsten, among others, with titanium being preferred because of its strength, durability, availability, low cost, ductility, low density, and its compatibility with the electrochemical cell environment. Conductive carbon is also often used. In one embodiment, the electrically conductive material comprises a plurality of VITON® cords woven or stitched into a conductive carbon cloth substrate. Pressure pad 230 is optionally configured to allow passage of water or system gases.

It has been discovered that improvements in the construction and operation of electrochemical cell 200 are found by providing a compression system that utilizes the generated hydrogen gas to assist in the compression of the electrochemical cell 200 while operating the electrochemical cell in a non-pressurized atmosphere. The utilization of generated hydrogen gas minimizes the amount of compression needed during assembly of the electrochemical cell stack. Additionally, further improvements can be made in the cost and ease of manufacture of electrochemical cell 200 are found by providing a biasing force, such as a spring washer in the pressure chamber.

Figure 3A:
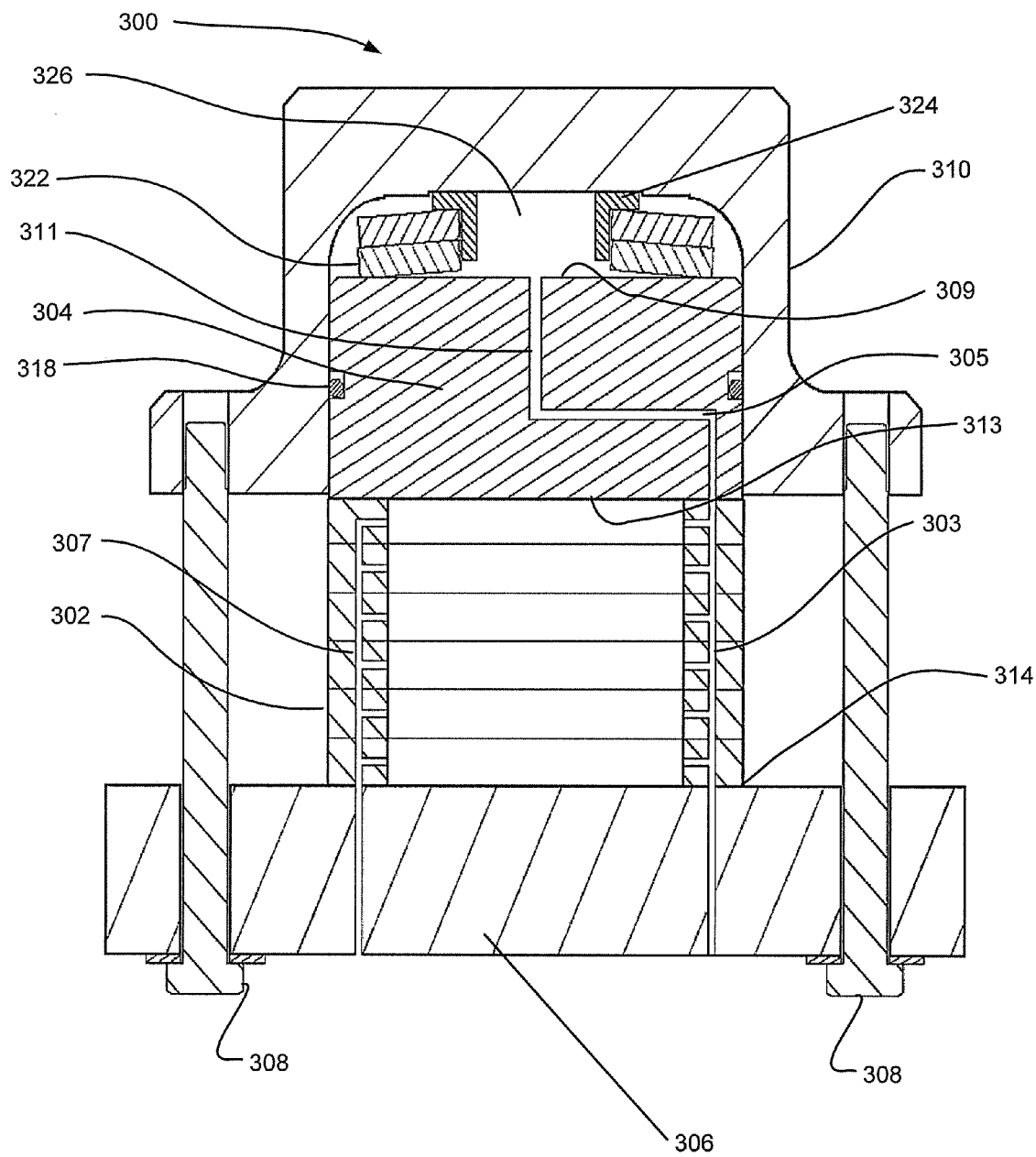
FIG. 3A is a front view partially in section of an exemplary embodiment of an electrochemical cell stack.

Referring now to FIG. 3A, an exemplary embodiment of an electrochemical cell stack 300 is illustrated. Cell stack 300, illustrated in FIG. 3, comprises a cell assembly 302. A cell stack 300 including only one cell assembly 302 is also considered within the scope of the present invention. Each of the hydrogen flow fields within the individual cells of cell assembly 302 are connected via conduit 303 which provides an exit path for the hydrogen gas generated by the cell assembly. Conduit 303 terminates on one end in a conduit 305 as described in more detail herein below. The opposite end of conduit 303 couples to the endplate 306 where the hydrogen gas is routed for use in the operators application (not shown) external to the cell stack 300. A similar conduit 307 provides water to the water/oxygen flow field from manifold endplate 306.

Figure 3B:
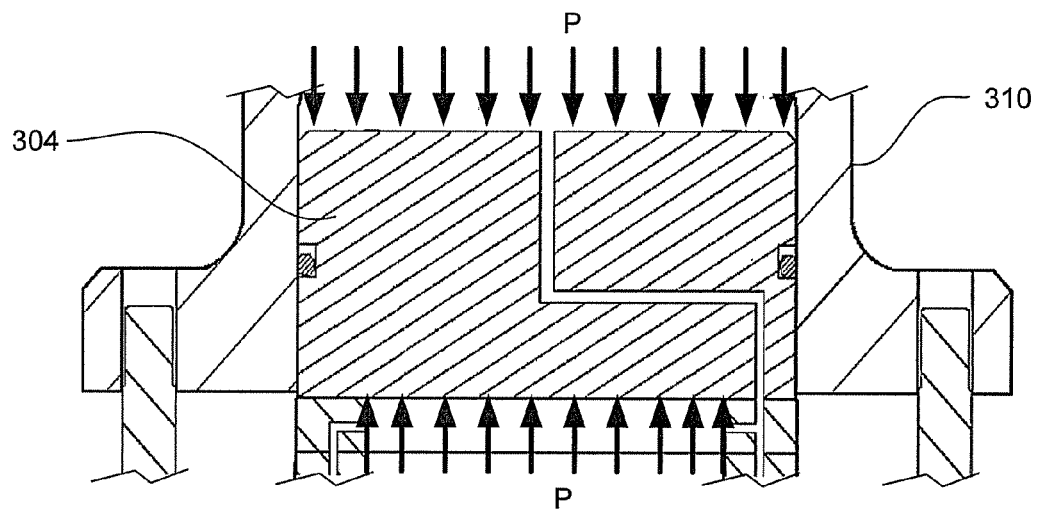
FIG. 3B is a partial front view of the electrochemical cell stack of FIG. 3A illustrating the pressures acting on the dynamic endplate.
Figure 3C:
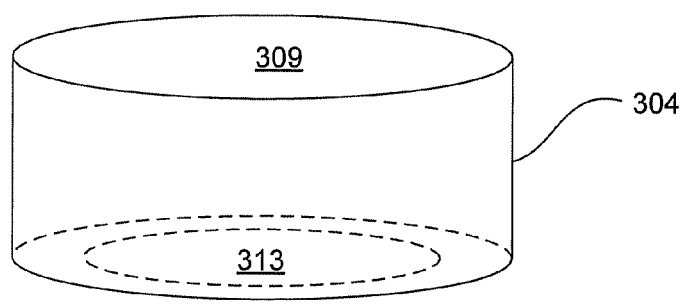
FIG. 3C is a perspective illustration of the dynamic endplate of FIG. 3A.

Cell assembly 302 is arranged between a dynamic endplate 304 and a manifold endplate 306. A plurality of bolts 308 couple the manifold endplate to the static endplate 310. Endplates 304, 306 and 310 are formed of any suitable material, such as but not limited to carbon steel, stainless steel, titanium, aluminum, graphite, ceramics, and the like. As shown in FIG. 3B-3C, in the exemplary embodiment, dynamic endplate 304 includes an upper surface area 309, and a lower surface area 313 that represent the areas over which the gas pressure exerts a force. The lower surface area 313 is smaller than the entire surface area of the dynamic endplate 304, and is generally the size of the active area of the cell 200 plus the area in the cell frames 214 where the gas is ported from the cell. The upper surface area 309 by contrast is the entire upper surface area of the dynamic endplate 304. Since the same pressure is acting on both the upper surface area 309 and the lower surface area 313, the size differential between the respective areas causes an axial biasing force against the cell assembly 302. This biasing force allows proper electrical connectivity and gas sealing to be maintained. In the exemplary embodiment, the ratio of the area 309 to the area 313 is greater than 1 and less than 3 and more preferably will have a ratio of 1.5 to 2.5.

A center conduit 311 provides a path for hydrogen gas to flow to pressure chamber 326. For reasons that will be made clearer herein, the dynamic endplate 304 is arranged to allow for translation in the axial direction independent from the static endplate 310.

In an alternate embodiment, the cell assembly 302 may be arranged to oxygen gas via conduit 303 to the pressure chamber 326. During the electrochemical process, the cell assembly 302 generates both hydrogen gas and oxygen gas. In a typical electrochemical cell stack 300 application, the oxygen gas is not utilized and is merely vented to the atmosphere. However, in some circumstances, such as in aerospace applications, it may be desirable to utilized the generated oxygen as well. Since the pressurized oxygen may be pressurized in a similar manner to hydrogen, it is contemplated that the use of oxygen instead of hydrogen may be utilized within the pressure chamber 326 to provide the loading force described below.

A static endplate 310 or a manifold endplate 306 having multiple components that cooperate together to form a unitary assembly are considered within the scope of the present invention. A seal 314 is positioned between manifold endplate 306 and the cell assembly 302 to form a leak-tight seal that prevents leakage of generated gas. A further seal 318 is provided between the dynamic endplate 304 and the static endplate 310.

To aid in the assembly and ensure an adequate initial compression of the cell assembly 302, one or more spring washers 322, or other similar spring type device is positioned between the top surface of dynamic endplate body portion 309 and the static endplate 310. In the exemplary embodiment, the spring washer 322 is a Belleville washer. A retaining ring 324 holds the spring washer 322 centered and coaxial with the endplates 304, 310 and the cell assembly 302 during the assembly process. The arrangement of the dynamic endplate 304, static endplate 310 and spring washers 322, form a pressure chamber 326. As will be described in more detail below, the spring washers 322 provide an initial compression force against the dynamic endplate 304 that produces sufficient pressure to allow the cell assembly 302 to operate while hydrogen gas is being generated and the operating pressure is attained. Once cell stack 300 is operating, generated hydrogen gas is utilized to pressurize the pressure chamber 326 and provide an additional second compression force against dynamic endplate 304. The second compression force allows cell stack 300 to be operated at high pressures while minimizing the initial compression force necessary for assembly. By minimizing the compression force required from the spring washers 322, advantages are realized by reducing manufacturing costs and lower cell stack 300 weight.

Cell stack 300 may also include additional fittings and brackets (not shown) that are well known in the art. Additionally tubing for feed water (not shown) from outside cell stack 300, and tubing for water and oxygen output (not shown), and tubing for hydrogen output (not shown) are also included. Fitting and tubing utilized with cell stack 300 are formed of any suitable material, such as but not limited to carbon steel, stainless steel, titanium, aluminum and the like.

During assembly, the cell assembly 302, dynamic endplate 304, Belleville washers 322, and cell assembly 302 are inserted into static endplate 310. The manifold endplate 306 is positioned over the cell assembly 302 and the bolts 308 are inserted and tightened. By tightening the bolts 308, the spring washers 322 are compressed, exerting a force on dynamic endplate 304 which is transferred through to the cell assembly 302. This initial or "pre-load" is needed to ensure adequate electrical conductivity and to make up and maintain any fluid sealing features between the cells in cell assembly 302.

As the cell stack 300 is operated, hydrogen gas is generated and flows through conduits 303, 305, 311 and eventually into pressure chamber 326. The pressure of the hydrogen gas is allowed to increase using techniques such as pressure regulators (not shown) that are known in the art. As the pressure of the hydrogen gas increases, the pressure of the gas in pressure chamber 326 also increases. Since the area of upper surface portion 309 is larger than the area of the lower surface portion 313, a biasing force is created against upper surface portion 309 of dynamic endplate 304. Since dynamic endplate 304 moves independently of static endplate 310, the load from the hydrogen gas in pressure chamber 326 and on upper surface portion 309 is translated through into the cell assembly 302. This additional loading on cell assembly 302 is needed to ensure sealing as the internal pressure within each individual cell increases.

The cell stack 300 represents a classic bolted joint situation. The standard jointed bolt can be described by two equations. The bolt load, $F_b$:

$$F_b = F_i + \frac{k_b}{k_b + k_c} \times F_e$$

and the load on the clamped components, $F_c$:

$$F_c = F_i - \frac{k_c}{k_b + k_c} \times F_e$$

Where $F_i$ represents the initial tightening force or pretension, $F_e$ represents the separating internal pressure from the generated hydrogen tending to separate the components, and $k$ represents the spring constants of the bolt and clamped components respectively. If no external load (for example: internal pressure) is applied to the joint, the bolt load and the clamped component load are both equal to the pretension. As the separating force, $F_e$, is applied to the bolted joint, the loads on the components are proportional to the relative stiffness of the components. The bolts 308 are often the stiffest components in the joint and consequently carry the largest portion of the separating load $F_e$. However, the load on the clamped components determines the sealing capability and electrical conductivity within the cell assembly 302.

Figure 4:
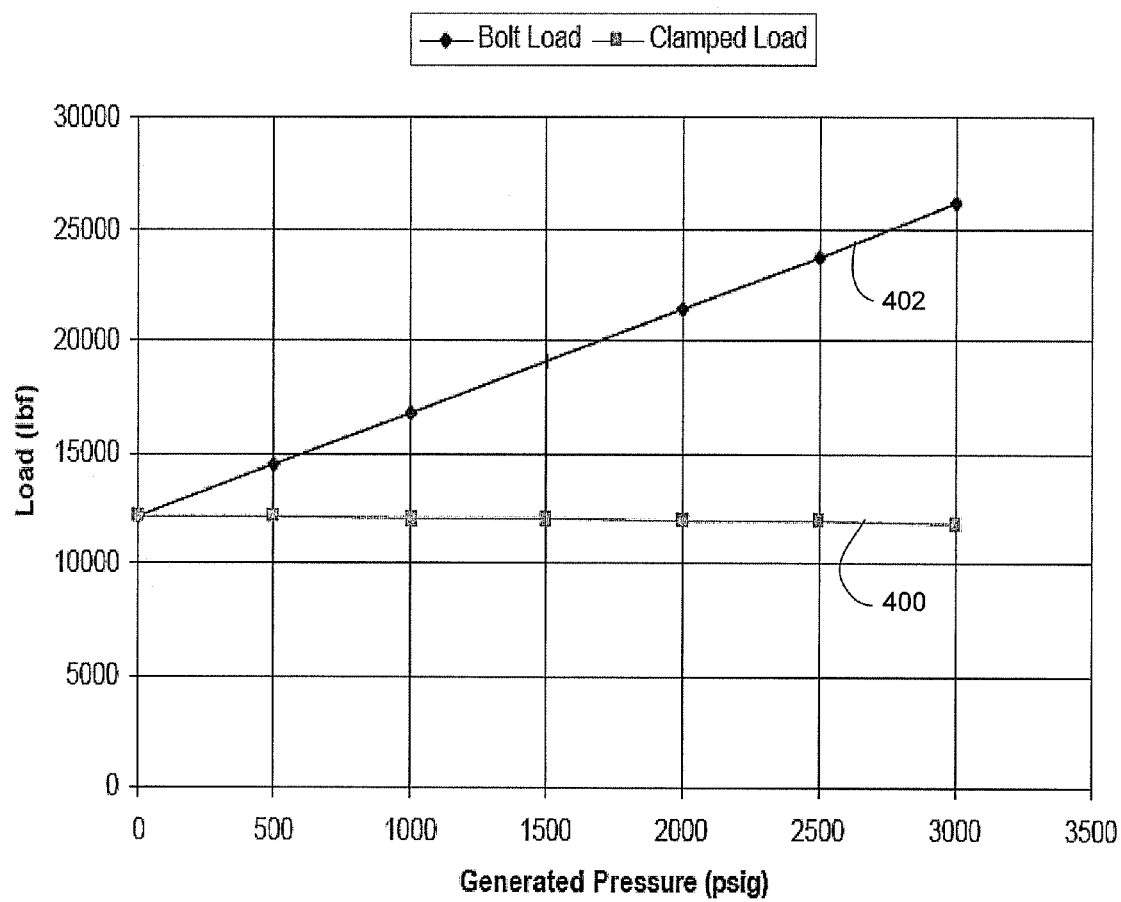
FIG. 4 is an illustration of the bolt and component loading under a range of pressures for a prior art electrochemical cell stack.

FIG. 4 illustrates a load profile for a typical prior art cell stack. Since the sealing and electrical conductivity of the cell assembly was reliant solely on the preload provided by the Belleville springs, a high initial preload was necessary to allow the prior art cell stack to operate over a wide range of pressures. In a typical prior art electrochemical cell stack, to achieve an operating pressure of 3,000 psig, the clamp load needed to be 26,000 lbf. This clamp load 400 in turn would require upwards of 60 Belleville washers for a typical prior art cell stack. This situation also placed additional stresses on the bolt loads 402 increasing the possibility of creep and fatigue issues over time. Since the amount of force necessary to generate the required preload increased as the hydrogen pressure increased, this placed substantial limitations on the manufacturability of high pressure cell stacks.

The need to achieve the level of preload in a typical prior art cell stack also has an impact on the equipment needed to properly assemble the cell stack. Typically, a cell stack is placed in a hydraulic press which compresses the cell stack assembly allowing the installation of the bolts that hold the spring washers. In this way the proper preload may be achieved. The size of the hydraulic press necessary for the assembly is determined by the operating pressure and the operating area (e.g. the area of the electrodes) of the cell stack. Since the operating area of the cell stack is a primary factor in the capacity or output of the cell stack, as this is increased and as operating pressure is increased, the hydraulic press requirements dramatically change. For example, a cell stack having a 0.05 ft^2 active area operating at 200 psi requires a hydraulic press capable of generating approximately 5000 lbf. While a 0.5 ft^2 active area cell stack at the same pressure requires a much larger hydraulic press with a capability of generating approximately 85,000 lbf.

Clearly as the size of the cell stack and the operating pressures increase, the manufacturability of the cell stack decreases. Since the cell stack 300 requires less preload due to the use of hydrogen gas generated during operation, the size of the hydraulic press needed for assembly is expected to be no more than one-half the size needed for a prior art cell stack of the same size and operating parameters. Further, as discussed above, the cell stack 300 will also be lighter than a prior art cell stack due to a reduction in the number of spring washers needed to provide the loading. The weight advantages of cell stack 300 become greater with greater operating pressures since lower operating pressure levels require fewer spring washers. Generally, the operating pressure for cell stack 300 will be greater than 400 psi and preferably greater than 1000 psi.

Figure 5:
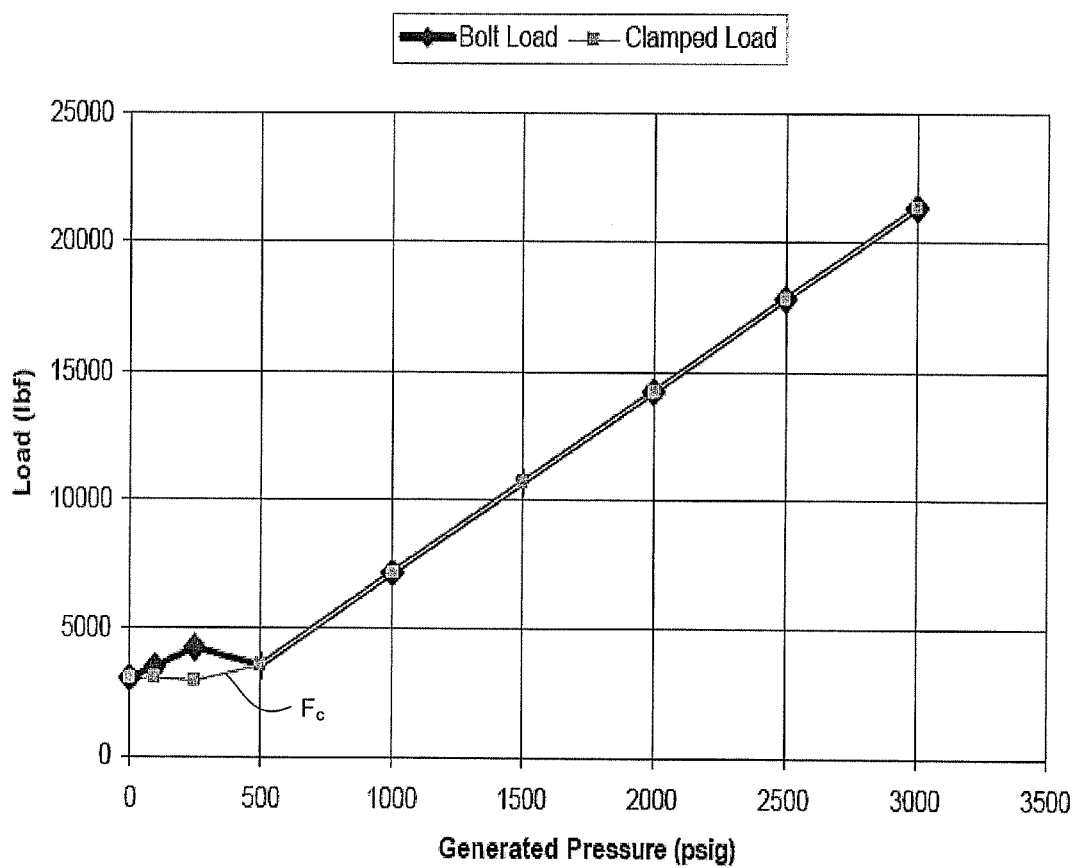
FIG. 5 is an illustration of the bolt and component loading under a range of pressures for the electrochemical cell stack of FIG. 3.

FIG. 5 illustrates a load profile for cell stack 300 that utilizes the pressure of the generated hydrogen gas ($F_i$) to increase the clamped component load $F_c$. At the initiation of operation, the cell stack 300 only needs sufficient component load $F_c$ to maintain electrical contact and maintain load pressure sealing to prevent water leakage. In the exemplary embodiment, the minimum component load $F_c$ was approximately 3000 lbf. Since this initial component load is generated by the spring washers 322, the number of spring washers 322 needed may be greatly reduced. As the cell stack 300 initiates operation, the pressure created by the hydrogen gas and the corresponding component load $F_c$ increase. This allows the cell assembly to maintain adequate sealing and electrical conductivity over the entire range of operation while having a minimal initial component load. Since the minimization of the component load $F_c$ is proportional to the number of spring washers 322 utilized in the cell stack 300, weight reductions in the range of 15% to 30% may be realized. Additionally, minimization of the component load $F_c$ provides additional advantages in reducing costs associated with the assembling the cell stack 300 through decreased labor hours, decreased material costs and elimination of special fixtures necessary to achieve the high preloading that was previously required.

Advantages of the present invention include improved sealing at higher pressures, simplicity of assembly and preparation, lower overall cell stack cost, increased reliability, increased cell life, and decreased space requirements. While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrochemical cell stack comprising:
    a plurality of cells, each of said plurality of cells having a membrane and a first and second electrode, said plurality of cells generating hydrogen at a pressure;
    a first static endplate coupled to said plurality of cells;
    a second static endplate mounted in a fixed relationship to said first static endplate, wherein said second static endplate is opposite said first static endplate;
    a third endplate mounted between said second static endplate and said plurality of cells, said third endplate movable between a first position and a second position under said pressure from said generated hydrogen; and,
    a pressure chamber formed between said static endplate and said dynamic endplate, said pressure chamber being fluidly coupled to said plurality of cells.

2. An electrochemical cell stack comprising:
    a plurality of cells, each of said plurality of cells having a membrane and a first and second electrode, said plurality of cells generating hydrogen at a pressure;
    a first static endplate coupled to said plurality of cells;
    a second static endplate mounted in a fixed relationship to said first static endplate, wherein said second static endplate is opposite said first static endplate;
    a dynamic endplate mounted between said second static endplate and said plurality of cells;
    a chamber formed between said static endplate and said dynamic endplate, said pressure chamber being fluidly coupled to said plurality of cells; and,
    a spring arranged between said second static endplate and said dynamic endplate.

3. The electrochemical cell stack of claim 2 wherein said hydrogen pressure is greater than 400 psi.

4. The electrochemical cell stack of claim 3 wherein the dynamic endplate has a first area in contact with the spring and a second area in contact with the plurality of cells wherein the ratio of the first area to the second area is greater than 1.

5. The electrochemical cell stack of claim 4 wherein the ratio of the first area to the second area is greater than 1 and less than 3.

6. The electrochemical cell stack of claim 5 wherein the ratio of the first area to the second area is between 1.5 to 2.5.

7. The electrochemical cell stack of claim 4 wherein each of said plurality of cells includes a conduit, said conduit being fluidly coupled to each of said plurality of cells and said pressure chamber.

8. The electrochemical cell stack of claim 7 wherein said hydrogen pressure is greater than 1000 psi.

9. An electrochemical cell stack comprising:
    a plurality of coaxially arranged cells, each of said cells having an anode electrode and a cathode electrode with a membrane disposed in between, said plurality of cells further having a first flow field in fluid communication with said anode electrode and a second flow field in fluid communication with said cathode electrode;
    a first static endplate arranged in contact with one end of said plurality of cells;
    a third endplate having an upper surface and a lower surface, said third endplate being arranged opposite said first static endplate with said lower surface being in contact with said plurality of cells;
    a second static endplate coupled to said first static endplate; and,
    a pressure chamber arranged between said second static endplate and said dynamic endplate;
    wherein said third endplate translates independently from said second static endplate between a first position and a second position in response to a gas pressure from said pressure chamber.

10. The electrochemical cell stack of claim 9 wherein the ratio of the area of said upper surface to the area of said lower surface is greater than 1.

11. The electrochemical cell stack of claim 10 wherein the ratio of the area of said upper surface to the area of said lower surface is between 1.5 and 2.5.

12. The electrochemical cell stack of claim 11 wherein the ratio of the area of said upper surface to the area of said lower surface is 1.5.

13. The electrochemical cell stack of claim 10 further comprising a means for applying pressure to said upper surface.

14. The electrochemical cell stack of claim 13 wherein said means for applying pressure is the hydrogen gas generated by said plurality of cells.

15. The electrochemical cell stack of claim 14 wherein said means for applying pressure further includes a spring arranged in said pressure chamber.

16. The electrochemical cell stack of claim 13 further comprising a retaining ring coupled to said second static endplate and at least one spring washer wherein said retaining ring and spring washer are positioned within said pressure chamber.

* * * * *